(12) United States Patent
Mizushima et al.

(10) Patent No.: US 8,029,141 B2
(45) Date of Patent: Oct. 4, 2011

(54) IMAGE DISPLAY APPARATUS THAT CONTROLS LUMINANCE OF A PARTIAL AREA OF EACH PIXEL TO BE BELOW THREEFOLD OF AN AVERAGE LUMINANCE VALUE OF THE ENTIRE PIXEL

(75) Inventors: Tetsuro Mizushima, Osaka (JP); Tatsuo Itoh, Osaka (JP); Kenichi Kasazumi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 459 days.

(21) Appl. No.: 12/301,904

(22) PCT Filed: May 23, 2007

(86) PCT No.: PCT/JP2007/060483
§ 371 (c)(1),
(2), (4) Date: Nov. 21, 2008

(87) PCT Pub. No.: WO2007/138940
PCT Pub. Date: Dec. 6, 2007

(65) Prior Publication Data
US 2010/0231861 A1 Sep. 16, 2010

(30) Foreign Application Priority Data
May 26, 2006 (JP) .................. 2006-146397

(51) Int. Cl.
| | |
|---|---|
| G03B 21/14 | (2006.01) |
| G02F 1/01 | (2006.01) |
| G02F 1/00 | (2006.01) |
| G02B 5/30 | (2006.01) |
| G02B 27/28 | (2006.01) |
| H01S 3/08 | (2006.01) |
| G01J 4/00 | (2006.01) |

(52) U.S. Cl. ............... 353/20; 353/38; 353/97; 359/279; 359/489.16; 359/489.06; 372/105; 348/752; 356/365

(58) Field of Classification Search .................... 353/20, 353/38, 97; 359/279, 489.16, 489.15, 489.06; 372/105; 348/752; 356/365
See application file for complete search history.

(56) References Cited

U.S. PATENT DOCUMENTS
7,128,420 B2 * 10/2006 Kapellner et al. .............. 353/38
(Continued)

FOREIGN PATENT DOCUMENTS
| | | |
|---|---|---|
| JP | 9-508476 | 8/1997 |
| JP | 10-301201 | 11/1998 |
| JP | 2002-268003 | 9/2002 |

(Continued)

OTHER PUBLICATIONS
International Search Report issued Aug. 21, 2007 in the International (PCT) Application No. PCT/JP2007/060483.

*Primary Examiner* — Georgia Y Epps
*Assistant Examiner* — Magda Cruz
(74) *Attorney, Agent, or Firm* — Wenderoth, Lind & Ponack, L.L.P.

(57) ABSTRACT

The image display apparatus includes a two-dimensional light modulation device for modulating light emitted from a laser light source, a display surface for displaying the modulated light, an optical pixel aperture enlarging member for distributing the luminance of the laser light while introducing the laser light to apertures of pixels of the modulation device; and a display pixel aperture enlarging portion for optically enlarging the modulated light by the apertures of the pixels of the modulation device corresponding to pixels of an image to be displayed. The luminance of a partial area of each pixel of the image displayed on the display surface is controlled to be below the threefold of an average value of the luminance in the area of the entire pixel by the optical pixel aperture enlarging member and the display pixel aperture enlarging portion, accomplishing speckle noise reduction and improved light utilization efficiency.

11 Claims, 11 Drawing Sheets

U.S. PATENT DOCUMENTS

Figure 1:
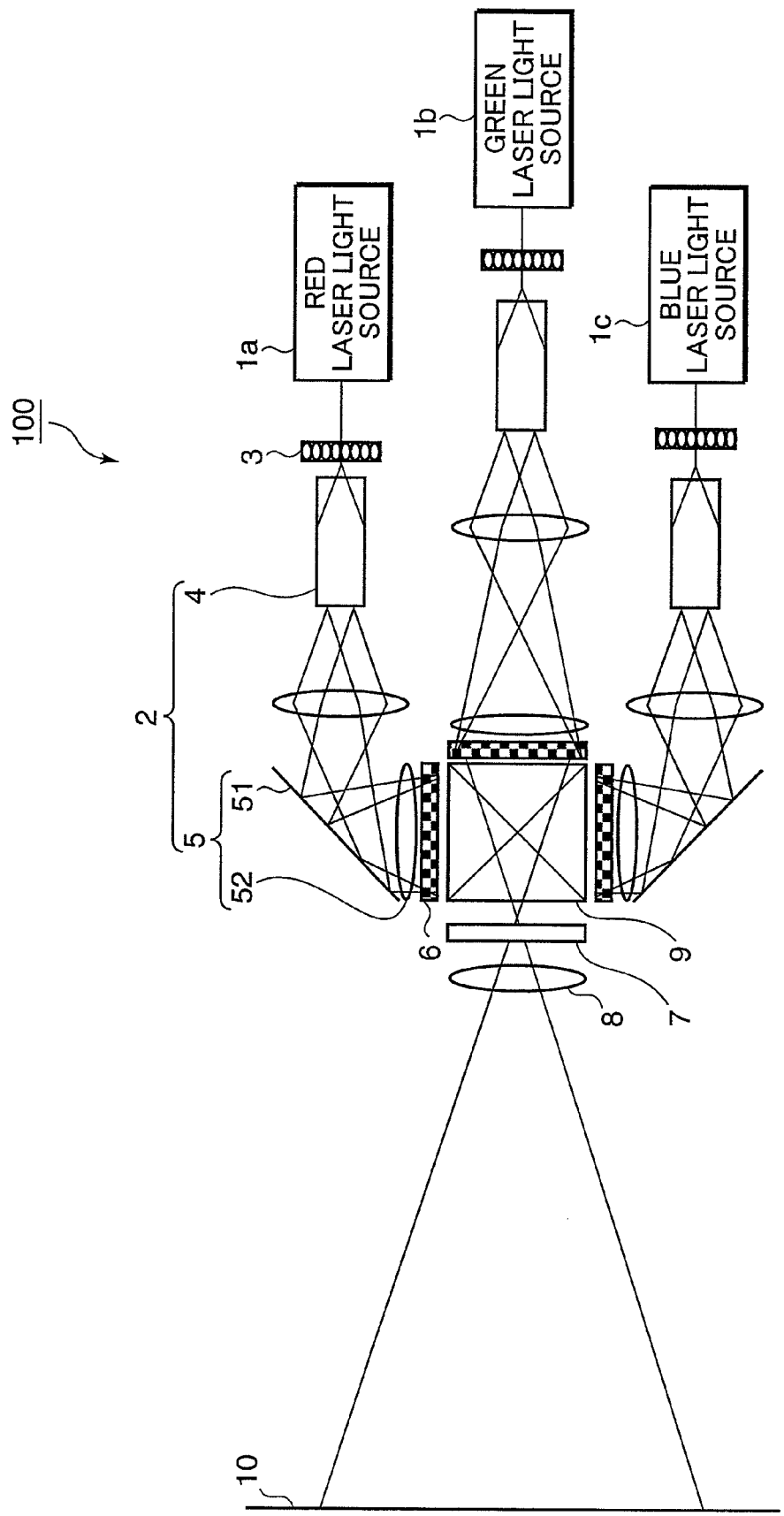

| | | | |
|---|---|---|---|
| 7,336,411 B2 * | 2/2008 | Miyagaki et al. | 359/279 |
| 7,365,721 B2 * | 4/2008 | Tanaka et al. | 345/87 |
| 2004/0239880 A1 | 12/2004 | Kapellner et al. | |
| 2006/0018025 A1 | 1/2006 | Sharon et al. | |

FOREIGN PATENT DOCUMENTS

| | | |
|---|---|---|
| JP | 2004-94192 | 3/2004 |
| JP | 2004-534276 | 11/2004 |
| JP | 2006-513447 | 4/2006 |

* cited by examiner

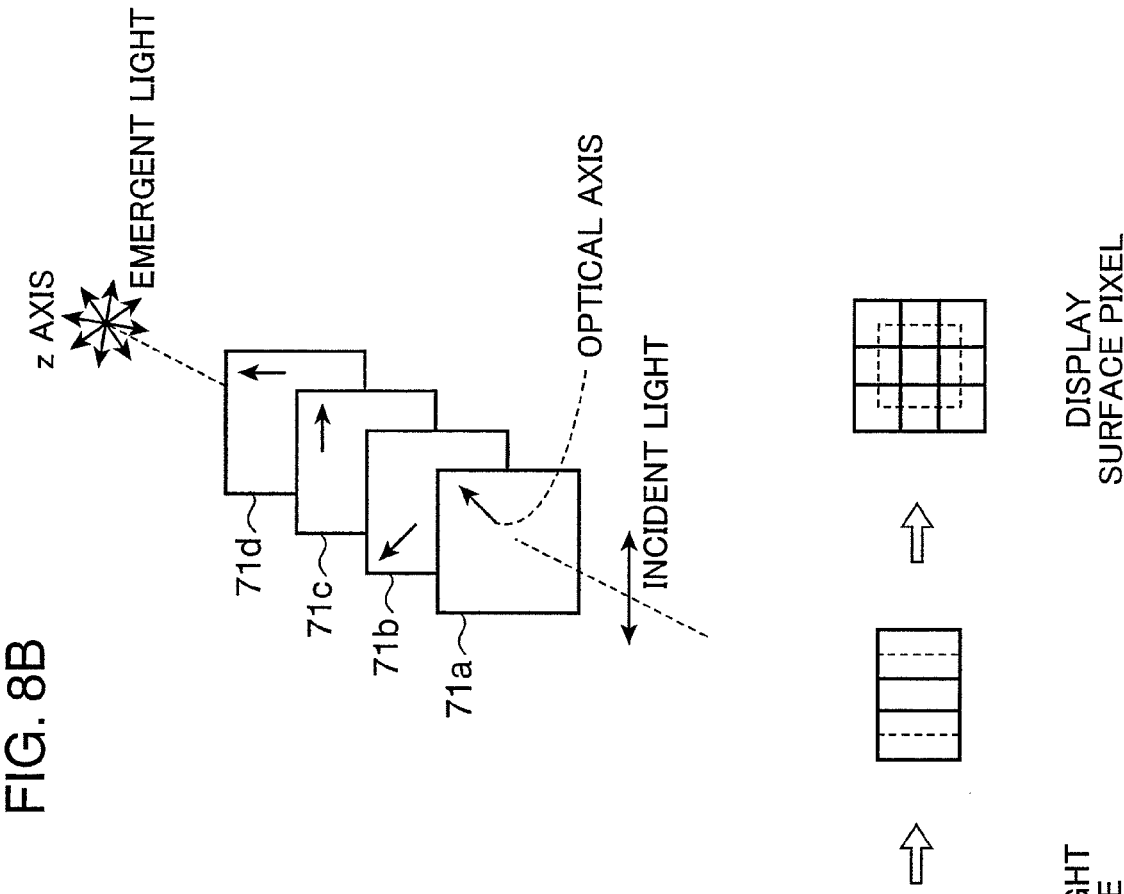
FIG. 8A
FIG. 8B
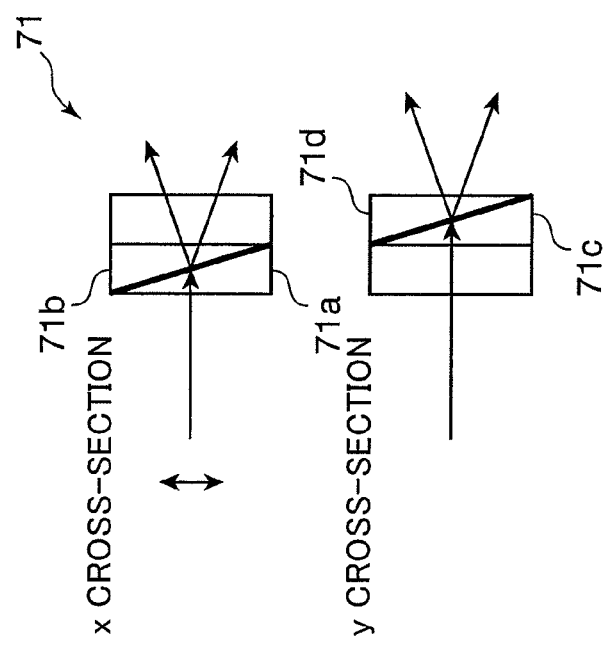
FIG. 8C

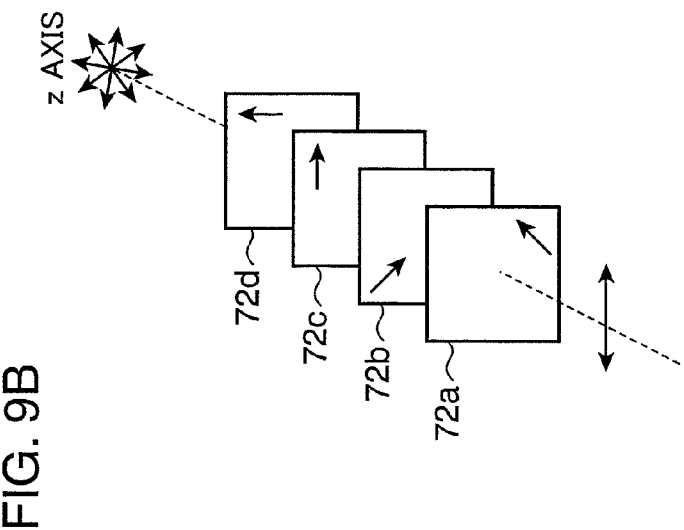
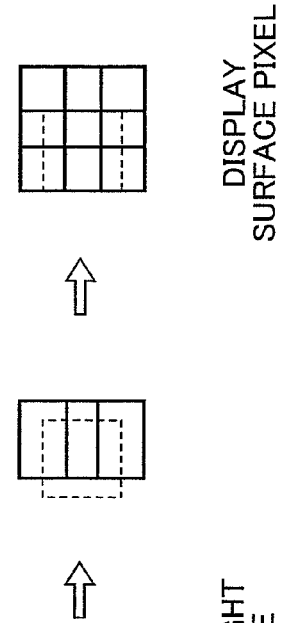
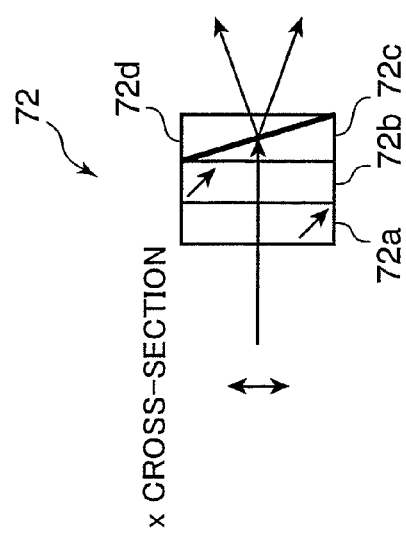
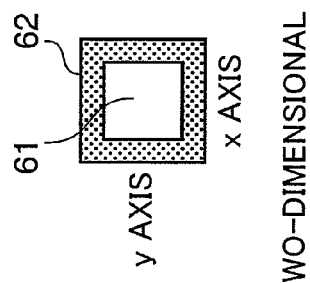

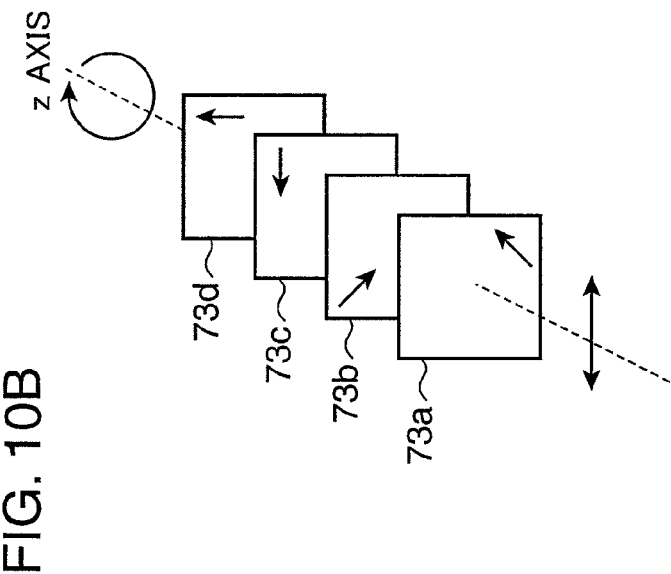
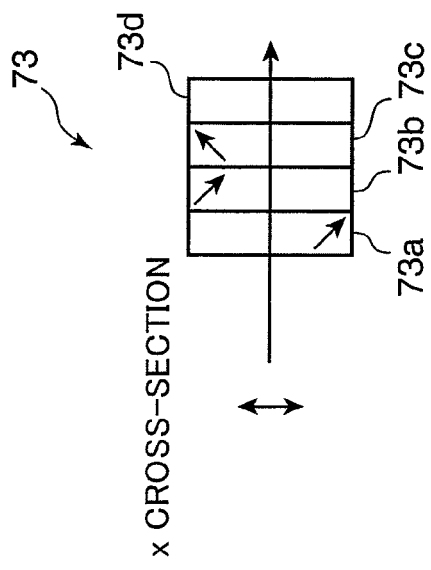
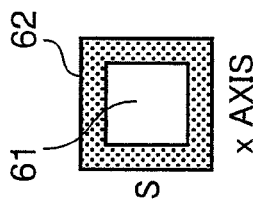

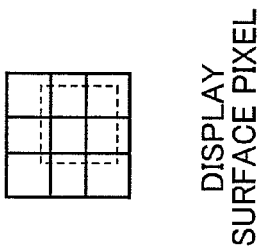
FIG. 11B
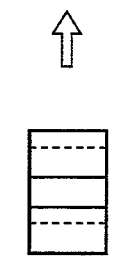
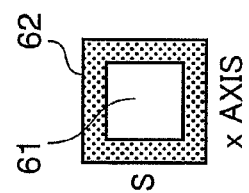
FIG. 11C
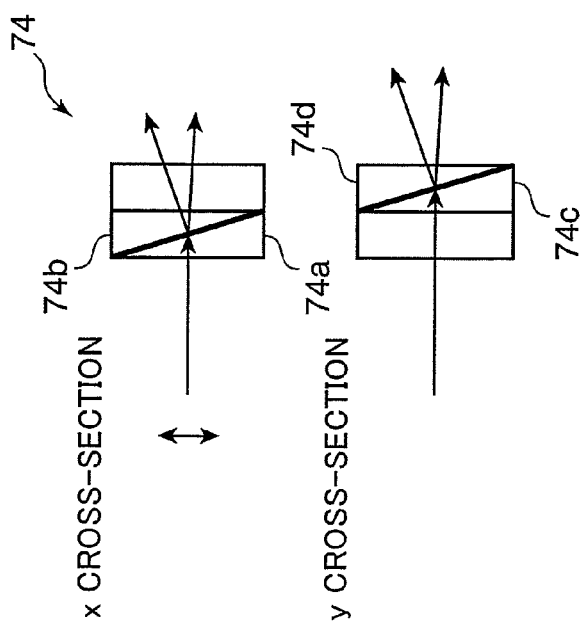
FIG. 11A

IMAGE DISPLAY APPARATUS THAT CONTROLS LUMINANCE OF A PARTIAL AREA OF EACH PIXEL TO BE BELOW THREEFOLD OF AN AVERAGE LUMINANCE VALUE OF THE ENTIRE PIXEL

FIELD OF THE INVENTION

The present invention relates to an image display apparatus such as a television receiver or a video projector.

DESCRIPTION OF THE BACKGROUND ART

Projection displays for projecting an image on a screen are widely used as image display apparatuses such as television receivers and video projectors. A lamp light source is generally used in such a projection display, but the lamp light source has problems of a short life, a restricted color reproduction area and low light utilization efficiency.

In order to solve these problems, an attempt has been made to use a laser light source as a light source of an image display apparatus. The laser light source has a longer life and the light utilization efficiency thereof is more easily increased due to its strong directivity. Further, since the laser light source has monochromaticity, a color reproduction area is large and a vivid image can be displayed.

However, in a display using a laser light source (hereinafter, called a "laser display"), speckle noise produced due to high coherency of laser light becomes problematic. The speckle noise is noise of microscopic particles produced as a result of mutual interference of diffused lights when laser light is diffused on a screen and perceivable by an observer. The speckle noise is noise in which particles of the size determined by the F (F-number) of the observer's eyes and the wavelength of the laser light source are randomly arranged, disrupts the perception of an image on the screen by the observer and induces severe image deterioration.

Patent literature 1 proposes to increase the substantial aperture ratio of a two-dimensional light modulation device by using a laser light source and a microlens array and to reduce diffracted lights by increasing light utilization efficiency. However, it is not studied how to solve problems such as speckle noise in the case of using laser light.

Proposal has been made for an image display apparatus using a laser image to obtain high light utilization efficiency by utilizing characteristics of a laser light source with a small light source area and strong directivity, but no proposal has been made to achieve a balance between speckle noise removal and high light utilization efficiency by utilizing a small-size two-dimensional light modulation device.

Since the use of a laser light source as a point light source increases power density caused by beam focusing, it leads to the deterioration of light resistance of the laser light source by light focusing, which was not a problem in conventional light sources.
Patent Literature 1:
 Japanese Unexamined Patent Publication No. 2002-268003

DISCLOSURE OF THE INVENTION

An object of the present invention is to provide an image display apparatus capable of reducing speckle noise, improving light utilization efficiency and having high reliability by utilizing a small-size two-dimensional light modulation device.

One aspect of the present invention is directed to an image display apparatus, comprising a laser light source; a spatial light modulation device for modulating the laser light emitted from the laser light source; a display surface for displaying the modulated light; an optical pixel aperture enlarging member for distributing the luminance of the laser light while introducing the laser light to apertures of pixels of the spatial light modulation device; and a display pixel aperture enlarging portion for optically enlarging the modulated light by the apertures of the pixels of the spatial light modulation device corresponding to pixels of an image to be displayed on the display surface, wherein the luminance of a partial area of each pixel of the image displayed on the display surface is controlled to be below the threefold of an average value of the luminance in the area of the entire pixel by the optical pixel aperture enlarging member and the display pixel aperture enlarging portion.

In the above image display apparatus, the luminance of the laser light is distributed while the laser light emitted from the laser light source is introduced to the respective pixels of the spatial light modulation device, whereby substantial aperture ratios of the respective pixels are improved to increase the utilization efficiency of the laser light and to increase light resistance. Further, since the luminance concentration of each pixel of the image displayed on the display surface can be alleviated, a degree of recognizing speckle noise by a viewer can be reduced.

BRIEF DESCRIPTION OF THE INVENTION

Figure 2:
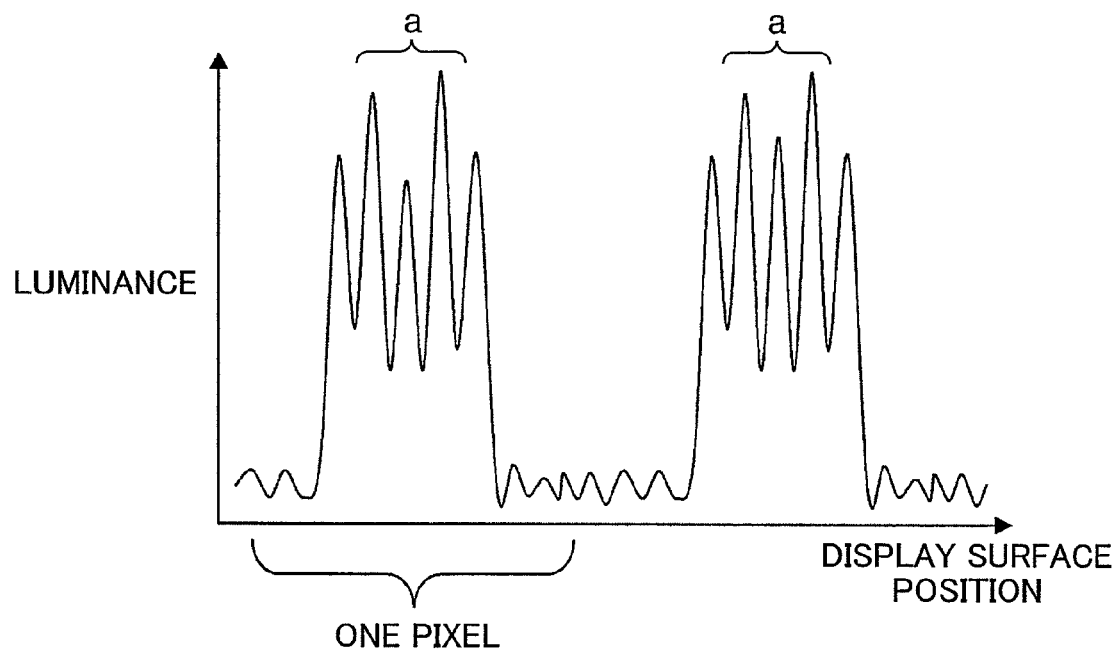
Figure 3:
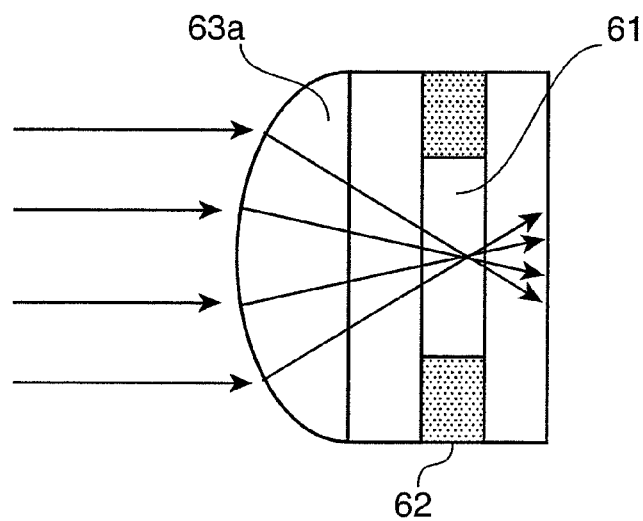
Figure 4:
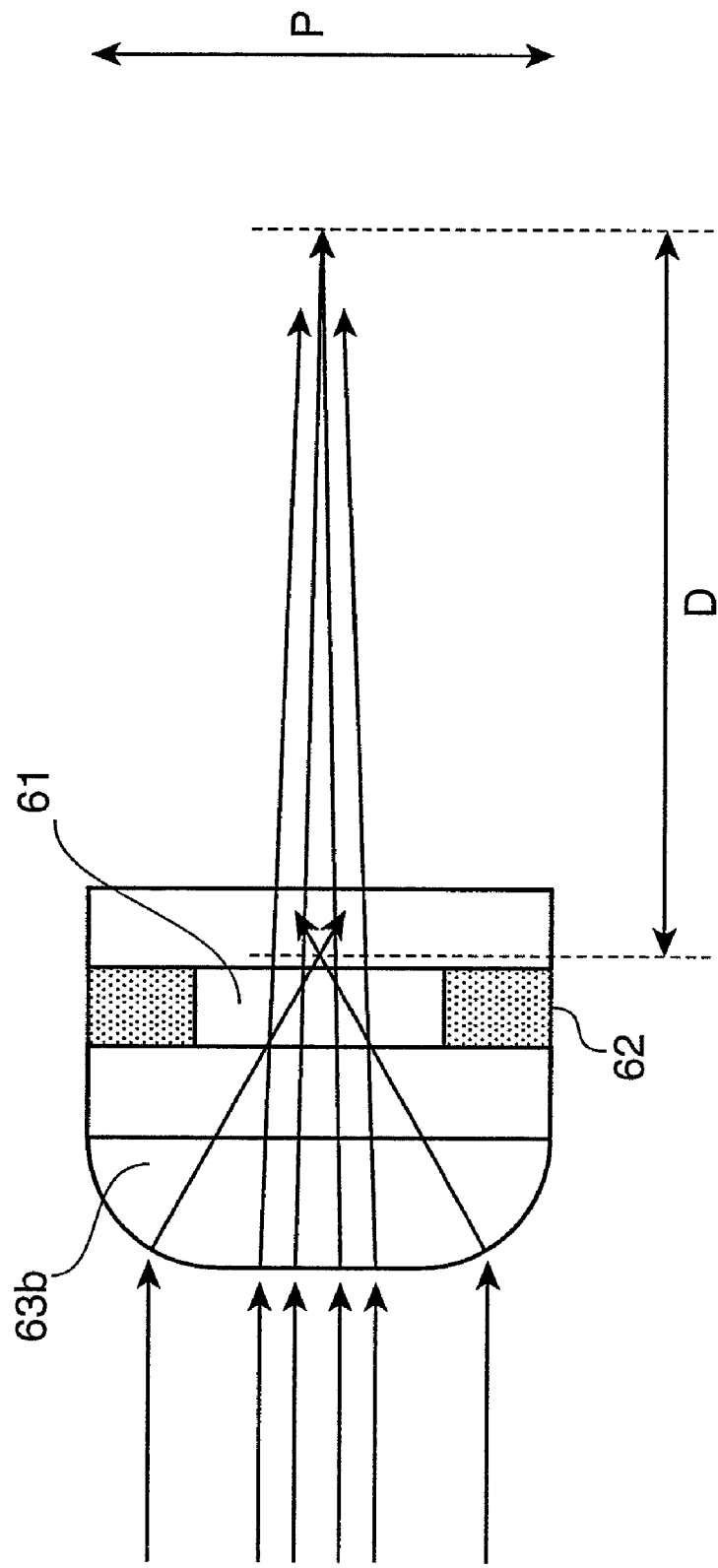
Figure 5:
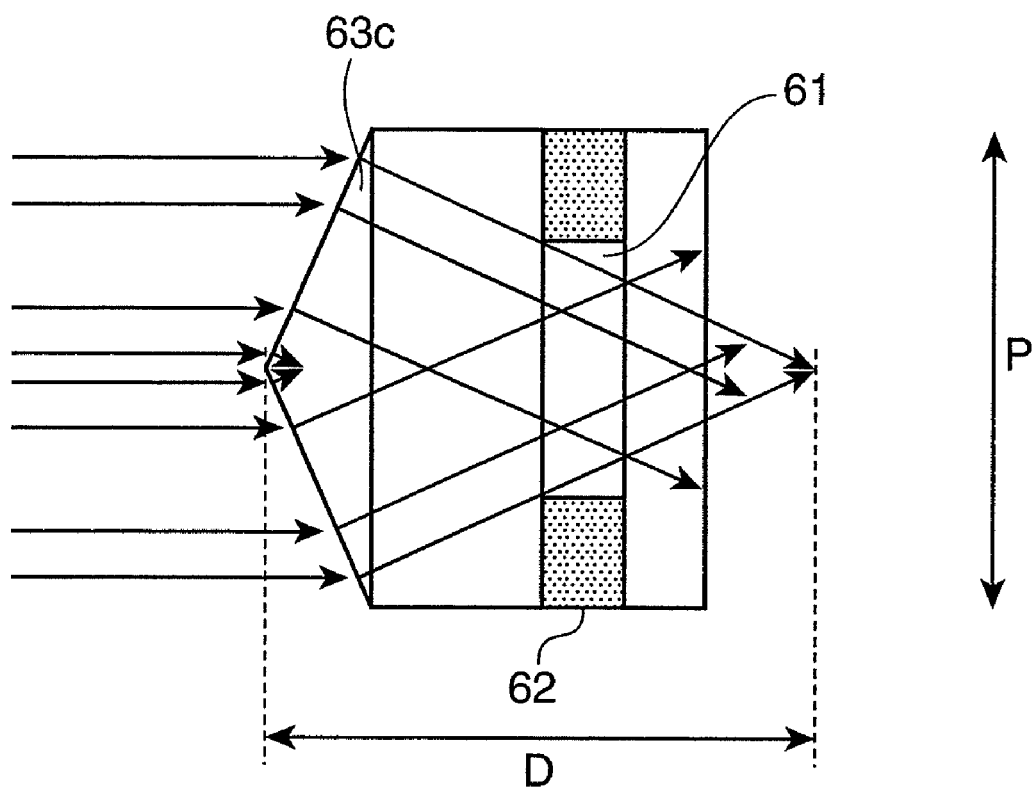
Figure 6:
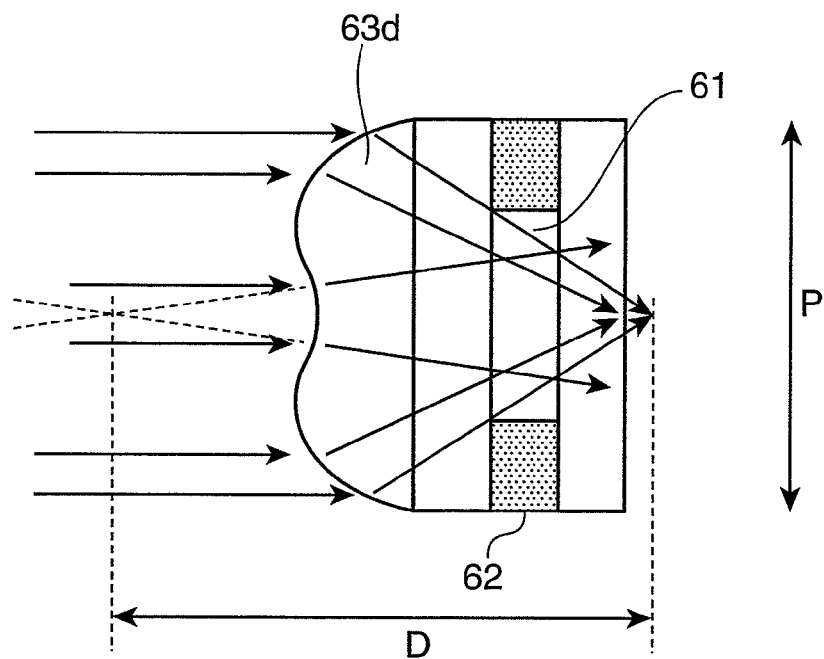
Figure 7:
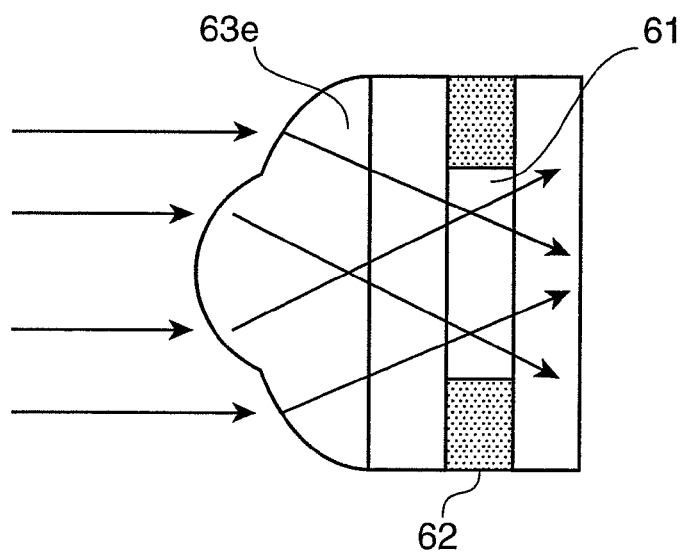
Figure 12:
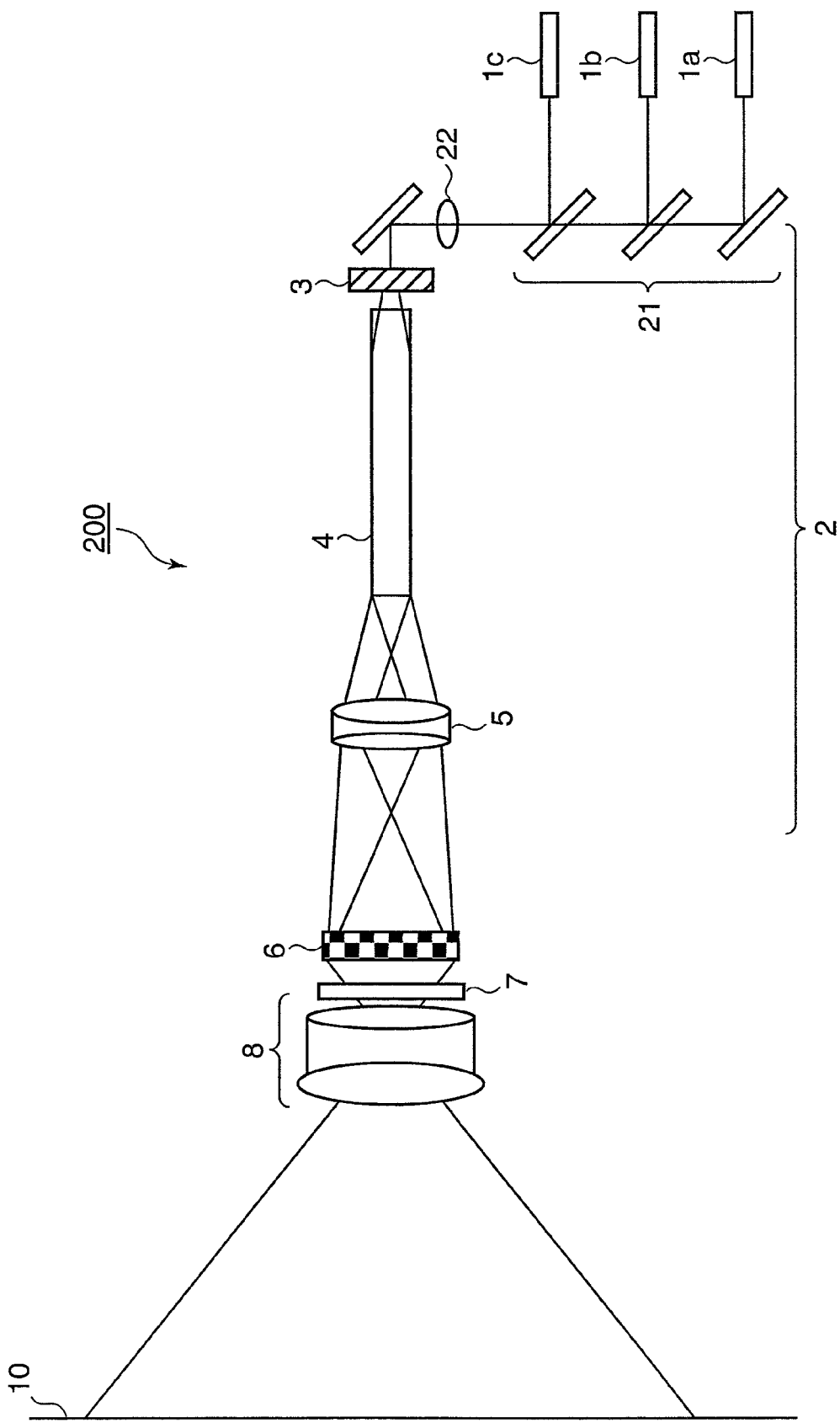
Figure 13:
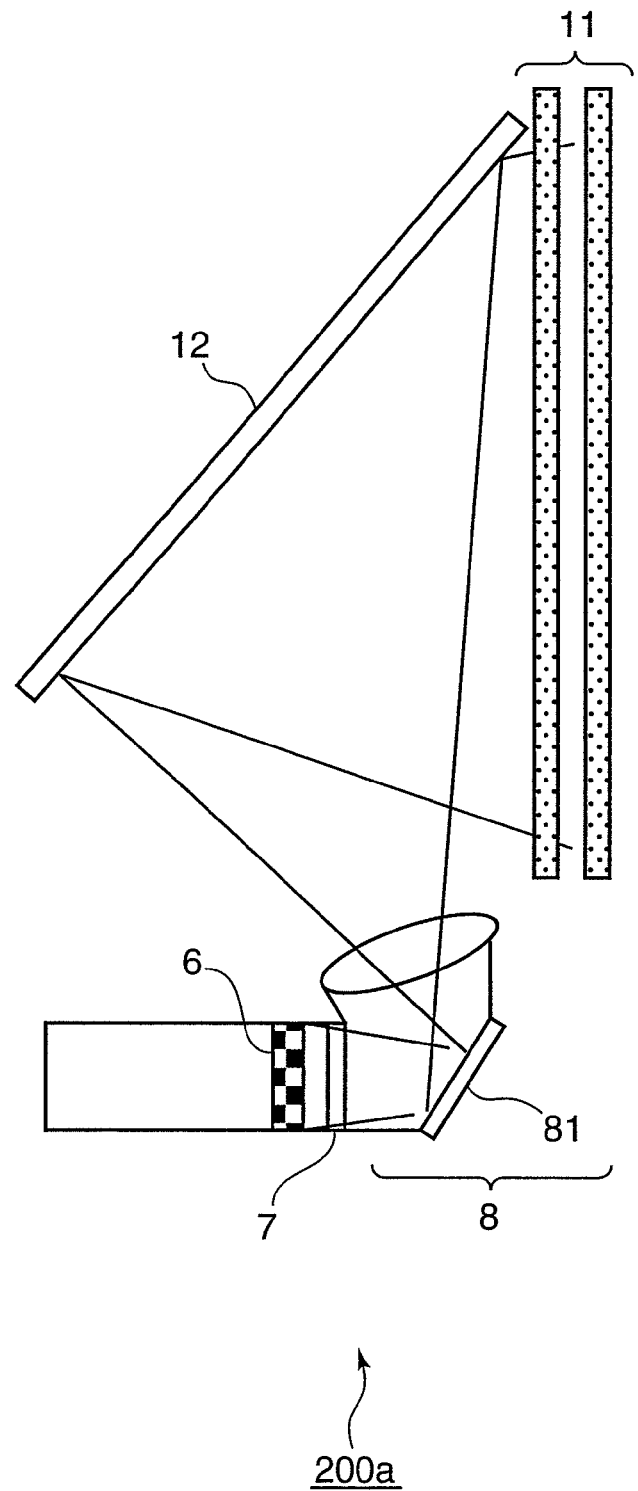

FIG. 1 is a diagram showing a schematic construction of an image display apparatus according to a first embodiment of the invention, FIG. 2 is a graph showing luminance fluctuation in a pixel caused by speckle noise, FIG. 3 is a diagram showing a schematic construction of a microlens included in a microlens array constituting an optical pixel aperture enlarging member, FIG. 4 is a diagram showing another schematic construction of the microlens included in the microlens array constituting the optical pixel aperture enlarging member, FIG. 5 is a diagram showing another schematic construction of the microlens included in the microlens array constituting the optical pixel aperture enlarging member, FIG. 6 is a diagram showing another schematic construction of the microlens included in the microlens array constituting the optical pixel aperture enlarging member, FIG. 7 is a diagram showing another schematic construction of the microlens included in the microlens array constituting the optical pixel aperture enlarging member, FIG. 8A is a diagram showing a schematic construction of a display pixel aperture enlarging portion, FIG. 8B is a diagram showing the operation of the display pixel aperture enlarging portion of FIG. 8A and FIG. 8C is a diagram showing an enlarged state of a pixel by the display pixel aperture enlarging portion of FIG. 8A, FIG. 9A is a diagram showing another schematic construction of the display pixel aperture enlarging portion, FIG. 9B is a diagram showing the operation of the display pixel aperture enlarging portion of FIG. 9A and FIG. 9C is a diagram showing an enlarged state of a pixel by the display pixel aperture enlarging portion of FIG. 9A, FIG. 10A is a diagram showing another schematic construction of the display pixel aperture enlarging portion, FIG. 10B is a diagram showing the operation of the display pixel aperture enlarging portion of FIG. 10A and FIG. 10C is a diagram showing an enlarged state of a pixel by the display pixel aperture enlarging portion of FIG. 10A, FIG. 11A is a diagram showing another schematic construction of the display pixel aperture enlarging portion, FIG. 11B is a diagram showing the operation of the display pixel aperture enlarging portion of FIG. 11A and FIG. 11C is a diagram showing an enlarged state of a pixel by the display pixel aperture enlarging portion of FIG. 11A, FIG. 12 is a diagram showing a schematic construction of an image display apparatus according to a second embodiment of the invention, and FIG. 13 is a diagram showing a schematic construction of an image display apparatus according to a third embodiment of the invention.

BEST MODES FOR EMBODYING THE INVENTION

Hereinafter, embodiments of the present invention are described with reference to the drawings. The same parts are identified by the same reference numerals and parts identified by the same reference numerals in the drawings may not be repeatedly described.

First Embodiment

FIG. 1 is a diagram showing a schematic construction of an image display apparatus 100 according to a first embodiment of the present invention. The image display apparatus 100 according to this embodiment relates to a projection display (laser display) using a laser light source.

As shown in FIG. 1, in the image display apparatus 100 according to this embodiment, lights emitted from laser light sources 1a to 1c of three colors of RGB are introduced to an illumination optical system 2 for illuminating two-dimensional light modulation devices 6. The illumination optical system 2 includes beam deflection controllers 3, optical integrators 4 and a projection optical system 5 and uniformizes the lights from the laser light sources 1a to 1c to illuminate the two-dimensional light modulation devices 6. The projection optical system 5 includes mirrors 51 and field lenses 52. The two-dimensional light modulation devices 6 modulate the respective colors of RGB, and the modulated lights of the respective colors are combined by a dichroic prism 9. The combined lights are enlarged on a screen (display surface) 10 by a projection optical system 8 to display a color image.

In the image display apparatus 100 according to this embodiment, each two-dimensional light modulation device 6 includes an optical pixel aperture enlarging member to be described later to improve the optical aperture ratios of pixels of the two-dimensional light modulation device 6. Further, a display pixel aperture enlarging portion 7 to be described later is arranged between the dichroic prism 9 and the projection optical system 8, and luminance uniformity in display pixels on the screen 10 is increased by projecting the lights combined by the dichroic prism 9 on the screen 10 through the display pixel aperture enlarging portion 7. These optical pixel aperture enlarging member and display pixel aperture enlarging portion 7 are described below.

The two-dimensional light modulation device 6 is a small-size two-dimensional light modulation device enabling the display of a high-definition image by reducing a pixel pitch and, as a result of its miniaturization, the optical aperture ratios of the respective pixels need to be improved. For example, an element in which the pixel aperture ratios of the respective pixels are below 80% is included in the two-dimensional light modulation device 6. Here, the pixel aperture ratio indicates a ratio of the area of a region (aperture) where light used for display is modulated in the pixel of the two-dimensional light modulation device and is expressed by the following equation.

Pixel aperture ratio=effective area contributing to display in one pixel/the area of the total region of one pixel A region (light shielding portion) not contributing to the display is taken up by metal wires of electrodes of the respective pixels and elements for individually controlling the respective pixels. In the small-size and high-definition two-dimensional light modulation device with the small pixel pitch, the pixel aperture ratios are lower. Thus, as described above, the two-dimensional light modulation device 6 includes the optical pixel aperture enlarging member for introducing the light for illuminating the two-dimensional light modulation device 6 to the apertures of the respective pixels to increase the quantity of light modulated in the respective apertures.

On the other hand, display is made on the screen 10 while the apertures of the respective pixels of the two-dimensional light modulation device 6 are enlarged by the projection optical system 8. Accordingly, the display pixel aperture enlarging portion 7 executes such a control that partial luminance in each pixel displayed on the screen 10 is below the threefold of an average value of the luminance of the entire pixel. Generally, laser light sources are good in focusing characteristic and coherency since having a very small light source area unlike lamp light sources. Thus, luminance concentrates on a part of the aperture of each pixel of the two-dimensional light modulation device. Accordingly, in this embodiment, luminance concentration in the pixels on the screen 10 is suppressed by alleviating the luminance concentration in the apertures of the pixels of the two-dimensional light modulation devices 6, and light utilization efficiency is improved by increasing the quantity of light modulated in the apertures of the pixels of the two-dimensional light modulation devices 6.

As a result of previous studies on the recognition of speckle noise by a viewer, it was found out that noise in bright parts (bright points) were strongly recognized as image noise. The speckle noise generates a random fluctuation pattern of bright parts and dark parts by coherency. The noise of the fluctuation patterns of these bright parts is strongly recognized. Image luminance fluctuation by the speckle noise is in proportion to luminance. If luminance is high, a fluctuation amplitude by the speckle noise increases. Thus, if there is a part in the pixel of the display surface where luminance is high, the fluctuation amplitude by the speckle noise increases and high-luminance noise to become a bright point appears. Therefore, bright points of high-luminance parts indicated by "a", for example, as shown in FIG. 2 are felt as glaring by a viewer.

If the viewer observes the display surface with the luminance concentration in the pixels, high-luminance bright noise appears and the speckle noise is strongly felt, wherefore image quality is degraded. Accordingly, in this embodiment, by controlling the luminance concentration in the pixels of the display surface, a fluctuation pattern of the speckle noise with high luminance and large amplitude is eliminated so that the speckle noise is not felt by the viewer. Since no speckle noise is produced in lamp light sources and the like, the luminance concentration in the pixels is not particularly problematic and luminance is concentrated in parts of the apertures of the two-dimensional light modulation devices to maximally increase light utilization efficiency. However, in the case of using a laser light source, the above luminance concentration becomes problematic.

The partial luminance in the pixel of the display surface means average luminance in an arbitrary area of the pixel. In this embodiment, regardless of which part in the pixel is extracted, its partial luminance is controlled to be below the threefold of the average luminance value of the entire pixel. An arbitrary area used to calculate the partial luminance may be an extracted area, which is 10 to 30% of the area of the pixel.

The partial luminance and average luminance value of each pixel of the display surface can be calculated from a received light quantity obtained by sensing the display surface by a CCD camera or the like. Particularly in this embodiment, the partial luminance in the case of displaying green color with a high luminosity factor is below the threefold of the average luminance value of the entire pixel. Preferably, the partial luminance in the case of displaying in the single one of the respective colors of the laser light sources is below the threefold of the average luminance value of the entire pixel. Upon image sensing using a CCD camera or the like, interference patterns such as moire and speckle may also be sensed, but measurement is made by eliminating the interference patterns or making them sufficiently fine patterns so as not to become noise in the luminance calculation. Besides image sensing using a CCD camera or the like, measurement can be made using a detector having light receivers finer than display pixels. In the case of controlling laser light in terms of time, measurement is so made as to be time-averaged.

The partial luminance in each pixel of the display surface can suppress the glaring of the bright pattern of the speckle noise if being below the threefold of the average luminance value of the pixel. The partial luminance is preferably below the twofold, more preferably below the 1.5-fold. By setting the partial luminance below the 1.5-fold, the viewer no longer feels partial glare.

An area in the pixel of the display surface where the partial luminance is below ⅓ of the average luminance value is preferably below 20% of the area of the pixel. The luminance of a partial area in the pixel can be prevented from increasing also by setting a small area for the dark part in each pixel.

Next, a specific construction of the optical pixel aperture enlarging member is described. The optical pixel aperture enlarging member includes a microlens array, in which a plurality of microlenses in a one-to-one correspondence with the apertures of the respective pixels of the two-dimensional light modulation device 6 are arrayed, and is arranged at a side of the two-dimensional light modulation device 6 toward the projection optical system 5. Each of FIGS. 4 to 7 shows the construction of the microlens included in the microlens array constituting the optical pixel aperture enlarging member. Microlenses 63b to 63e shown in FIGS. 4 to 7 prevents light emitted to the two-dimensional light modulation device 6 from being shielded to lose the quantity of the emitted light by a light shielding portion 62 upon introducing the light to an aperture 61 of a pixel.

The microlens 63a shown in FIG. 3 is good in maximally preventing light emitted from a lamp light source or the like from being shielded by the light shielding portion 62, and is a spherical or aspherical lens with the focus of the lens conformed to the center of the aperture 61. Thus, in the case of a laser light source, a focal point concentrates on one point and the luminance of the incident light is not distributed, wherefore an intensity distribution in the aperture 61 is uneven.

In contrast, in this embodiment, luminance is distributed as the microlenses 63b to 63e shown in FIGS. 4 to 7 do. Particularly, the microlenses 63b to 63e are preferable since the focal points thereof are discretely or continuously connected. Light emitted from the laser light source is light emitted from a point light source and having directivity and the angle of the light incident on the microlens can be controlled. In the microlenses 63b to 63e of FIGS. 4 to 7, light emitted form the laser light source is incident in the form of substantially parallel light, whereby the intensity distribution of the aperture 61 can be designed by the shape of the microlens. In this embodiment, the focal points of microlens 63b to 63e are discretely or continuously connected, whereby the intensity in the aperture 61 is substantially even and the luminance concentration in the aperture 61 can be suppressed. The microlens whose focal points are discretely or continuously connected can suppress the luminance concentration in the two-dimensional light modulation device 6 and can prevent the deterioration of the two-dimensional light modulation device 6 by an increase of power density at beam focused positions in the case of using the laser light source. The focal points of this embodiment mean points where the light is focused when the collimated light is incident on the microlens. The image display apparatus including the two-dimensional light modulation device having the optical pixel aperture enlarging member made of microlenses whose focal points are discretely or continuously connected and the laser light source can be an invention by itself.

An inner circumferential portion of the microlens 63b of FIG. 4 has a large radius of curvature and a substantially flat shape, an outer circumferential portion thereof has a shape with a refractive power and the focal points are discretely connected in the inner and outer circumferential portions. A case where there is no refractive power in the inner circumferential portion and the focal point is infinite falls under a state where the focal points are discretely connected.

The microlens 63c of FIG. 5 has a conical lens shape and the focal points are continuously connected from the inner circumferential side to the outer circumferential side, so that a beam at such an angle as to avoid the light shielding portion 62 can be generated in each pixel.

In the microlens 63d of FIG. 6, the inner circumferential portion has a negative refractive power and the outer circumferential portion has a positive refractive power. A beam divergent to such an extent as not be shaded by the light shielding portion 62 is generated from the inner circumferential portion, and a focused beam is generated from the outer circumferential portion. The inner circumferential portion has focal points in a minus direction from the incident surface, and the outer circumferential portion has focal points discrete in a plus direction. The microlens 63d discretely has focal points.

In the microlens 63e of FIG. 7, the radius of curvature differs between the inner circumferential portion and the outer circumferential portion. The radius of curvature of the inner circumferential portion is smaller and the focal points are located at the incident surface side. The focal points are discretely connected in the inner circumferential portion and the outer circumferential portion.

As a construction similar to the microlenses 63b, 63d and 63e, a construction with two or more focal points by having three or more curvatures or a continuously changing curvature may be employed. The focal points need not coincide with the central axis of the pixel aperture, and the lens shape may not be symmetrical with respect to the central axis.

Although layers at the incident sides of the microlenses 63b to 63e are not shown in FIGS. 4 to 7, they have a refractive index different from that of the microlens material to provide the microlenses with refractive powers. If the incident side layer has a higher refractive index than the microlens, a repulsive force is produced contrary to the cases of FIGS. 4 to 7, but effects similar to those in FIGS. 4 to 7 can be obtained by reversing the microlens shapes of FIGS. 4 to 7.

In this embodiment, a distance between the focal points is preferably longer than the pixel pitch. By setting the distance between the focal points longer than the pixel pitch, luminance concentration points of the aperture 61 are distributed and display can be made with no luminance concentration constantly given even in the case of enlarged display on the screen 10 by means of the projection optical system 8. Examples of the distance D between the focal points are shown in FIGS. 4 to 6. The distance D between the focal points is longer than the pixel pitch P. The pixel pitch P is a distance between the centers of adjacent pixels. D denotes the distance between two points in the case of two focal points and denotes a longest distance between focal points in the case of three or more focal points. Also in the case where the focal points are continuous as in the microlens 63c, a longest distance between the focal end points is considered. In the case of having a negative refractive power as in the inner circumferential portion of the microlens 63d, D is considered with the focus position in the minus direction as one focal point.

The focal points of the microlens of this embodiment are preferably such that the focal points of the lens outer circumferential portion are more distant from the lens incident surface than those of the lens inner circumferential portion. Specifically, the focal points of the inner circumferential portion are closer to the incident surface of the microlens and those of the outer circumferential portion are more distant from the incident surface as in the microlenses 63c and 63d. In the case of three or more focal points, the focal points of the more outer circumferential portion are successively more distant from the microlens incident surface. In the case of enlargedly displaying a two-dimensionally modulated image by a projection lens, no image is display if light is shaded (cut off) by the projection optical system. If an excessive angle is given to a beam by the microlens, the beam is shaded by the projection optical system and light utilization efficiency decreases. By locating the focal points from the lens outer circumferential portion at more distant positions, a beam angle distribution given by the microlens is suppressed to a minimum level and high light utilization efficiency can be obtained in cooperation with the projection optical system.

Particularly, the distribution of the focal points of the microlens of this embodiment is preferably wider at a blue laser wavelength (400 to 500 nm) than at a longer wavelength (green or red laser wavelength of 500 to 700 nm). Specifically, if Db denotes a distance between focal points of the microlens for blue laser light and Dg, Dr denote distances between focal points for green laser light and red laser light, Db>Dg and Db >Dr.

In the image display apparatus using high-output laser lights, the focal point distribution is widened particularly for blue laser light having a shortest wavelength among RGB, so that no power concentration occurs. Since the blue laser light has a higher focusing property and higher energy than laser lights of the other colors, the two-dimensional light modulation device is deteriorated by adhesion resulting from thermal and chemical reactions. In the microlens of this embodiment, deterioration by blue laser light can be prevented by widening the focal point distribution for blue laser light than those for green and red laser lights.

Next, the display pixel aperture enlarging portion 7 is described. The image display apparatus 100 of this embodiment preferably includes the display pixel aperture enlarging portion 7 between the screen 10 and the two-dimensional light modulation devices 6. In the image display apparatus 100, the display pixel aperture enlarging portion 7 is inserted behind a position where the lights from the two-dimensional light modulation devices 6 are combined by the dichroic prism 9. Alternatively, the display pixel aperture enlarging portion 7 can be incorporated into the projection optical system 8. The display pixel aperture enlarging portion 7 increases the luminance uniformity of the display pixels by displaying an image with the ratios of the areas taken up by the apertures of the pixels displayed on the screen 10 set larger than the aperture ratios of the pixels of the two-dimensional light modulation devices 6.

FIGS. 8A to 11C are diagrams showing the display pixel aperture enlarging portion 7, wherein FIGS. 8A, 9A, 10A and 11A are diagrams showing schematic constructions of the display pixel aperture enlarging portion 7, FIGS. 8B, 9B, 10B and 11B are diagrams showing operations of the display pixel aperture enlarging portion 7 and FIGS. 8C, 9C, 10C and 11C are diagrams showing enlarged states of the pixel by the display pixel aperture enlarging portion 7.

The display pixel aperture enlarging portion 7 shifts the angle or position of incident light with respect to an optical axis of crystal using a birefringent property of the crystal depending on whether the incident light is an ordinary beam or an extraordinary beam to make the ratios of the areas taken up by the apertures of the pixels of the screen 10 larger than the ratios of the apertures of the pixels of the two-dimensional light modulation devices 6, thereby displaying the incident light on the screen 10. The area of the aperture enlarged by the display pixel aperture enlarging portion 7 may be larger than one pixel, but is preferably enlarged to an area equal to or smaller than two pixels. In the case of enlargement larger than two pixels, image resolution is degraded and a blurred image is displayed. Preferably, the area ratio of the aperture displayed on the screen 10 is 80 to 200% of the area of the entire region of one pixel.

Although examples using a birefringent material are shown in FIGS. 8A to 11C, it is sufficient for the display pixel aperture enlarging portion 7 to make the area ratios of the apertures on the screen 10 larger than the aperture ratios of the two-dimensional light modulation devices 6. For example, the area ratios of the apertures perceived by humans may be looked larger by time integration by suitably setting the focus and aberrations of the projection optical system 8, using a screen thicker than a depth of focus or providing a movable part between the two-dimensional light modulation devices 6 and the screen 10 to move the aperture with time. Particularly, since luminance is easily concentrated on the aperture centers in the small-size two-dimensional light modulation device including the above optical pixel aperture enlarging member, it is preferable to use means for displacing the aperture centers themselves such as means for shifting to different angles and positions by the birefringent property like the display pixel aperture enlarging portion 7 of FIGS. 8A to 11c or means for displacing the centers with time by the movable part. A displacement of the aperture center is preferably such that an interval between the image positions of the aperture center on the screen is 10 to 90% of the pixel pitch on the screen. The displacement of the aperture center is insufficient and the luminance concentration cannot be sufficiently reduced if the above interval is smaller than 10%, and image resolution is deteriorated if the above interval is larger than 90%.

The display pixel aperture enlarging portion 7 preferably utilizes the birefringent property as shown in FIGS. 8A to 11C in cooperation of the two-dimensional light modulation devices 6 utilizing light polarization. By employing such a construction, the displacements of the aperture centers on the screen 10 can be accomplished without using any movable means. Birefringent plates in FIGS. 8A to 11C indicate different refractive indices for ordinary and extraordinary beams with respect to the optical axis. Optical crystals such as quartz, sapphire, $LiNbO_3$ can be used as the material of the birefringent plates.

Particularly, the display pixel aperture enlarging portion 7 preferably emits the lights after converting linearly polarized lights into circularly polarized lights or randomly polarized lights. Speckle noise produced upon using a laser light source is interference noise, and polarized lights orthogonal to each other do not mutually interfere, wherefore the speckle noise can be reduced by projecting the lights to the screen 10 after converting the linearly polarized lights into the circularly polarized lights or randomly polarized lights. Since lights emitted from the laser light sources 1a to 1c of the image display apparatus 100 of this embodiment are linearly polarized lights, they are preferably displayed after being converted into circularly polarized lights or randomly polarized lights. Particularly, the rear projection image display apparatus includes the projection optical system or the mirror in the housing and reflectance differs depending on a polarization direction, wherefore lights can be introduced to the display surface at a uniform reflectance independently of the polarization direction by being converted into circularly polarized lights or randomly polarized lights.

A display pixel aperture enlarging portion 73 of FIGS. 10A to 10C includes a quarter wave plate 73d and emergent lights therefrom are circularly polarized lights. The quarter wave plate 73d preferably corresponds to all the laser wavelengths used in the image display apparatus 100 and is made of a polymer liquid crystal material in this embodiment. The emergent circularly polarized lights may be slightly flattened.

On the other hand, since the laser lights are converted into randomly polarized lights in a display pixel aperture enlarging portion 71 of FIGS. 8A to 8C, a display pixel aperture enlarging portion 72 of FIGS. 9A to 9C and a display pixel aperture enlarging portion 74 of FIGS. 11A to 11C, birefringent plates having wedge angles are used. The birefringent plate having the wedge angle in this embodiment is a birefringent plate, one surface of which is inclined with respect to the optical axis, and a wedge angle direction indicates a direction of the angle of inclination. The birefringent plates produce different polarized lights depending on the passing positions of beams to emit randomly polarized lights since crystal optical axes lie in a plane (xy plane) orthogonal to the incident light and the thicknesses thereof differ depending on the passing positions of the beams. Further, ordinary and extraordinary beams are emitted at different angles by the wedge angle, thereby enlarging the display pixel aperture. The birefringent plate having the wedge angle is used while being paired with a plate for compensating for the wedge angle (e.g. birefringent plates 74a and 74b of FIG. 11A). It is sufficient for at least one of the plates (e.g. one of the birefringent plates 74a and 74b of FIG. 11A) to have a birefringent property. At least one plate having the birefringent property enables conversion into randomly polarized lights and beam angle separation. It is preferable in light of reducing cost to make one plate of a general glass material having no birefringent property. In a preferable mode, the plate for compensating the wedge angle is also made of the same material having the birefringent property and the optical axes of a pair of materials having the wedge angles are orthogonal. For example, the birefringent plates 71a and 71b of FIG. 8A are made of the same material, and the optical axes thereof are in a 45° direction and a 135° direction in the xy plane. By employing such a construction, the angle for separation into ordinary and extraordinary beams can be symmetrical with respect to an incident beam, wherefore the display pixel aperture enlargement can be easily controlled. The first birefringent plate on which the incident light is first incident is preferably such that the optical axis thereof is facing in the 45° direction with respect to the direction of the incident linearly polarized light. By setting in the 45° direction, the beam can be equally separated.

The display pixel aperture enlarging portion 71 shown in FIG. 8A includes four birefringent plates 71a to 71d having wedge angles. By separating angles of the pixel in an x-axis direction and a y-axis direction by the wedge angles of the four birefringent plates 71a to 71d, the apertures of the display pixels are enlarged. Further, the linear polarized lights of the laser lights are emitted as randomly polarized lights. Each of a pair of birefringent plates 71a and 71b and a pair of birefringent plates 71c and 71d are made of the same birefringent material, have optical axes orthogonal to each other, and are combined in such a relationship as to compensate for the wedge angle. The pair of birefringent plates 71a and 71b and the pair of birefringent plates 71c and 71d have orthogonal wedge angle directions. In other words, the birefringent plates 71a and 71b are in an x cross-sectional direction and the birefringent plates 71c and 71d are in a y cross-sectional direction. By having such a relationship, the birefringent plates 71a and 71b separate the angle in the x-axis direction and the birefringent plates 71c and 71d separate the angle in the y-axis direction, whereby display is made with the aperture centers of the display pixels displaced. The display pixel aperture enlarging portion 71 of FIG. 8A is a preferable mode enabling angle separation and complicated conversion into randomly polarized lights.

FIG. 8B shows the optical axis directions of the fourth birefringent plates 71a to 71d and the direction of the incident polarized light by arrows. The optical axes of the birefringent plates 71a to 71d lie in the xy plane (in the plane orthogonal to the incident light). When the linearly polarized light of the x-axis direction is incident, the birefringent plate 71a is facing in a 45° direction, the birefringent plate 71b in a 135° direction, the birefringent plate 71c in a 0° direction and the birefringent plate 71d in a 90° direction. The pair of birefringent plates 71a and 71b and the pair of birefringent plates 71c and 71d are a preferable mode having optical axes orthogonal in the respective pairs and having symmetrical separation angles.

The display pixel aperture enlarging portion 72 shown in FIG. 9A includes two parallel birefringent plates 72a and 72b and two birefringent plates 72c and 72d having wedge angles. The birefringent plates 72c and 72d having the wedge angles perform angle separation in the x-axis direction and conversion into randomly polarized lights as emergent beams. The parallel birefringent plates 72a and 72b have optical axes inclined with respect to the direction of the incident light (z axis) and emit beams while shifting the positions of ordinary and extraordinary beams. The ordinary beam propagates straight and the extraordinary beam is emitted while having the position thereof shifted. The shifting direction by the birefringent plate 72a is an oblique upward direction in the xy plane and that by the birefringent plate 72b is an oblique downward direction in the xy plane due to the optical axis directions of the birefringent plates 72a and 72b. Shifting distances are determined by the inclinations of the optical axes, refractive indices for ordinary and extraordinary beams and the thicknesses of the birefringent plates 72a and 72b and can be controlled.

FIG. 9B shows exemplary optical axes of the birefringent plates 72a to 72d by arrows. For example, when the linearly polarized light of the x-axis direction is incident, the birefringent plate 72a has an optical axis in a direction at 45° to the x axis and 45° to the z axis and the birefringent plate 72b has an optical axis in the direction at 45° to the x axis and 45° to the z axis. The two parallel birefringent plates 72a and 72b separate the beam to suitable positions by having the optical axes at different angles in the xy plane.

The display pixel aperture enlarging portion 73 shown in FIG. 10A includes three parallel birefringent plates 73a, 73b and 73c, and the quarter wave plate 73d. The quarter wave plate 73d converts the emergent light from the birefringent plates 73a, 73b and 73c into circularly polarized light. The birefringent plates 73a, 73b and 73c shift the positions of the incident light in the x-axis direction and the y-axis direction to displace the positions of the aperture centers on the screen 10. The first and second birefringent plates 73a and 73b are similar to the birefringent plates 72a and 72b of the display pixel aperture enlarging portion 72 of FIG. 9A, and the optical axis of the third birefringent plate 73c is inclined in an xz plane to shift the position in the x-axis direction. For example, the optical axis of the third birefringent plate 73c in a direction at −180° to the x axis and 45° to the z axis.

The display pixel aperture enlarging portion 74 of FIG. 11A includes two birefringent plates 74a and 74c and two isotropic plates 74b and 74d. The birefringent plates 74a and 74b have wedge angles in the X-axis direction, thereby performing angle separation in the x-axis direction and conversion into randomly polarized lights. The birefringent plates 74c and 74d have wedge angles in the y-axis direction, thereby performing angle separation in the y-axis direction and conversion into randomly polarized lights. In this way, the positions of the aperture centers of the screen 10 are displaced. Since the two isotropic plates 74b and 74d can be made of a general glass material, this example is preferable in reducing cost. The isotropic plates 74b and 74d preferably have substantially the same refractive index as the birefringent plates 74a and 74c to prevent reflection loss and the like. The wedge angles of the two birefringent plates 74a and 74c of the display pixel aperture enlarging portion 74 are orthogonal to each other, which is a preferable mode enabling angle separation in two axes and complicated conversion into randomly polarized lights.

The birefringent plates and the quarter wave plate forming the above display pixel aperture enlarging portion 7 may be bonded using a transparent adhesive whose refractive index is substantially the same as that of the birefringent plate material. It is preferable to provide antireflection coatings for the wavelengths of the laser light sources used on the incident and emergent surfaces of the display pixel aperture enlarging portion 7.

In the image display apparatus 100 of this embodiment, a beam deflection controller 3 for controlling a beam deflection direction of the laser light in terms of time is preferably provided between at least one of the laser light sources 1a to 1c and the two-dimensional light modulation device 6. In the image display apparatus 100, the beam deflection controllers 3 are provided between the laser light sources 1a to 1c and the optical integrators 4. The lights are focused at the focal points of the two-dimensional light modulation devices 6 by the optical pixel aperture enlarging members. By changing the incident light angles on the microlenses of the optical pixel aperture enlarging members with time using the beam deflection controllers 3, the focus positions are changed with time, whereby the luminance concentration of the apertures can be further prevented. A movable mirror, a movable lens, a movable diffusing plate or the like can be used as the beam deflection controller 3, but any other element can also be used as such provided that it can change the beam deflection direction with time.

Second Embodiment

Next, a second embodiment of the present invention is described. FIG. 12 is a diagram showing a schematic construction of an image display apparatus according to the second embodiment of the present invention. An image display apparatus 200 according to this embodiment relates to a projection display (laser display) using laser light sources similar to the image display apparatus 100 of the first embodiment, but differs from the first embodiment in including only one two-dimensional light modulation device.

In the image display apparatus 200 of this embodiment, as shown in FIG. 12, one two-dimensional light modulation device 6 is used for lights of three RGB colors from laser light sources 1a to 1c, the lights of three colors are combined by a dichroic mirror 21 in an illumination optical system 2, introduced to a beam deflection controller 3 via a lens 22, mirrors, etc. and illuminate the two-dimensional light modulation device 6 including an optical pixel aperture enlarging member via an optical integrator 4 and a projection optical system 5. The laser light sources 1a to 1c of RGB successively emit laser lights to use the two-dimensional light modulation device 6 in a time sharing manner. The lights emitted from the two-dimensional light modulation device 6 are enlargedly projected onto a screen 10 by a projection optical system 8 including a display pixel aperture enlarging portion 7.

Third Embodiment

Next, a third embodiment of the present invention is described. FIG. 13 is a diagram showing a schematic construction of an image display apparatus according to the third embodiment of the present invention. An image display apparatus 200a according to this embodiment is the application of the image display apparatus of the second embodiment to a rear projection display (laser display).

In the image display apparatus 200a of this embodiment, as shown in FIG. 13, light emerging from a projection optical system 8 is displayed on a transmission screen 11 by way of a rear mirror 12. The projection optical system 8 includes a lens group and a reflecting mirror 81 for bending an optical path.

A display pixel aperture enlarging portion 7 may be a reflective device integral to the reflecting mirror 81 and, for example, may display aperture centers in a displaced manner with time using the reflecting mirror as the movable mirror. A preferable example is such that linear polarized light is incident on the display pixel aperture enlarging portion 7 like the display pixel aperture enlarging portions 71 to 74 of FIGS. 8A to 11C using the birefringent property and converted such that the emergent light is circularly or randomly polarized light. The case of rear projection is more preferable since the rear mirror and the reflecting mirror are provided as shown in FIG. 13 and, thus, the linearly polarized light can be converted into the circularly or randomly polarized light and introduced to a display surface at a uniform reflectance independent of a polarization direction.

Besides being incorporated into the optical system, the display pixel aperture enlarging portion 7 may be provided as a function of the transmission screen 11 as the display surface. As a construction, the transmission screen 11 is provided with two or more diffusion layers, which are separated. The apertures recognized by a viewer are displayed with an area ratio per pixel enlarged after multilayer diffusion. A distance between the diffusion layers is 100 μm or longer, preferably 200 μm or longer, more preferably 500 μm or longer. As the distance becomes longer, an aperture enlarging effect is increased. However, if the distance is excessively long, image resolution deteriorates and the total thickness of the transmission screen 11 increases to enlarge the transmission screen 11. Therefore, the distance is preferably 5 mm or shorter. The total thickness of the transmission screen 11 is preferably 1 mm or larger. By using such a transmission screen, the display pixel aperture enlarging effect is exhibited and the area ratios of the apertures are increased to alleviate luminance concentration.

In the above first to third embodiments, the image display apparatuses may include a laser light source of a single color or may include laser light sources of three or more colors.

In the above first to third embodiments, the laser light source of each color may be constructed by a plurality of laser devices for emitting lights of substantially the same wavelengths or may be constructed by a single laser device.

Although the images of the two-dimensional light modulation devices are enlargedly displayed on the display surface by the projection optical system in the above first to third embodiments, the lights emerging from the two-dimensional light modulation devices may be directly displayed on the display surface without enlarging the images. The two-dimensional light modulation devices may be not only of the transmissive type, but also of the reflective type, and preferably utilize polarized lights using liquid crystal. Efficient modulation is possible in conjunction with the linearly polarizing property of the laser light sources. The illumination optical system for illuminating the two-dimensional light modulation devices is not limited to those of the above embodiments and is sufficient to be able to illuminate the two-dimensional light modulation devices with lights from the laser light sources. For example, in a liquid crystal display, a liquid crystal display panel including a two-dimensional light modulation device constitutes a display surface and the two-dimensional light modulation device is illuminated with lights from laser light sources in the liquid crystal display panel.

Although an image is displayed on the screen in the above first to third embodiments, a two-dimensional image may be displayed on something other than the screen. In other words, the display surface can be anything provided that a viewer can recognize a two-dimensional image. For example, application in the case of directly displaying on a wall, liquid or retina is also possible.

According to the above first to third embodiments, image display apparatuses can be provided which display a vivid image using the laser light sources, have high light utilization efficiency and have glaring on the display surface eliminated.

The present invention is summarized as follows from the above respective embodiments. An image display apparatus according to the present invention comprises a laser light source; a spatial light modulation device for modulating the laser light emitted from the laser light source; a display surface for displaying the modulated light; an optical pixel aperture enlarging member for distributing the luminance of the laser light while introducing the laser light to apertures of pixels of the spatial light modulation device; and a display pixel aperture enlarging portion for optically enlarging the modulated light by the apertures of the pixels of the spatial light modulation device corresponding to pixels of an image to be displayed on the display surface, wherein the luminance of a partial area of each pixel of the image displayed on the display surface is controlled to be below the threefold of an average value of the luminance in the area of the entire pixel by the optical pixel aperture enlarging member and the display pixel aperture enlarging portion.

In the above image display apparatus, the luminance of the laser light is distributed while the laser light emitted from the laser light source is introduced to the respective pixels of the spatial light modulation device, whereby substantial aperture ratios of the respective pixels are improved to increase the utilization efficiency of the laser light and to increase light resistance. Further, since the luminance concentration of each pixel of the image displayed on the display surface can be alleviated, a degree of recognizing speckle noise by a viewer can be reduced.

It is preferable that the optical pixel aperture enlarging member is a microlens array, in which a plurality of microlenses arranged in a one-to-one correspondence with the respective pixels of the spatial light modulation device for introducing the laser light toward the apertures of the corresponding pixels are arrayed; that each microlens has a plurality of focal points; and that a plurality of focal points of the laser light focused by each microlens are discretely or continuously located.

In this case, the luminance concentration by the laser light in the aperture of each pixel is reduced, with the result that the luminance concentration in each pixel of the image displayed on the display surface can be reduced.

A distance between the most spaced apart ones of the plurality of focal points is preferably longer than a distance between adjacent pixels of the spatial light modulation device.

In this case, luminance concentration points by the laser light in the aperture of each pixel are distributed, with the result that the luminance concentration in each pixel of the image displayed on the display surface can be alleviated.

The plurality of focal points are preferably more distant from an incident surface of each microlens as an incident position of the laser light on the incident surface is located more toward an outer circumferential portion from a central part of the incident surface.

In this case, the quantity of light to be lost upon being projected onto the display surface is reduced and the utilization efficiency of the laser light is improved since a variation range of an emergence angle of the laser light by the microlens can be reduced.

It is preferable that the laser light emitted from the laser light source includes blue laser light, green laser light and red laser light; that the distance between the most spaced apart ones of the plurality of focal points differs among the blue laser light, the green laser light and the red laser light; and that a distance $Db$ between the focal points of the blue laser light, a distance $Dg$ between the focal points of the green laser light and a distance $Dr$ between the focal points of the red laser light satisfy the following relationship:

$$Db > Dg \text{ and } Db > Dr.$$

In this case, by making a focal point distribution of the blue laser light wider than those of the green laser light and red laser light, the deterioration of the spatial light modulation device by the blue laser light can be prevented.

An aperture ratio of each pixel of the spatial light modulation device is preferably below 80%.

In this case, the utilization efficiency of the laser light can be increased by improving the substantial aperture ratio of each pixel even in the case of using a small-size two-dimensional light modulation device capable of displaying a high-definition image.

The display pixel aperture enlarging portion preferably converts the modulated light into circularly polarized light or preferably converts the modulated light into randomly polarized light.

In this case, mutually interfering lights can be reduced to reduce the speckle noise by converting the linearly polarized light of the laser light into circularly or randomly polarized light.

The display pixel aperture enlarging portion preferably includes at least one birefringent plate having a wedge angle and enlarges the modulated light by causing the modulated light to be incident on the birefringent plate to separate it into two lights having different emergence angles.

In this case, it is possible to convert the modulated light into randomly polarized light and to efficiently enlarge the modulated light by the apertures of the respective pixels of the spatial light modulation device.

The display pixel aperture enlarging portion preferably includes two birefringent plates having wedge angles orthogonal to each other.

In this case, it is possible to separate a beam in two axes and to generate complicated randomly polarized light.

It is preferable to further comprise a deflection direction changer arranged between the laser light source and the spatial light modulation device for changing a beam deflection direction of the laser light emitted from the laser light source with time.

In this case, since the angle of the laser light incident on the spatial light modulation device changes with time, the incidence angle of the light focused on the aperture of each pixel of the spatial light modulation device also changes with time. Thus, the focused position of the laser light changes with time in the aperture of each pixel and the luminance concentration by the laser light in the aperture of each pixel is alleviated.

INDUSTRIAL APPLICABILITY

Since an image display apparatus according to the present invention can accomplish speckle noise removal and an improvement of light utilization efficiency using a small-size two-dimensional light modulation device, it can be suitably used in a video display apparatus such as a video projector, a television receiver or a liquid crystal panel.

What is claimed is:

1. An image display apparatus, comprising:
a laser light source;
a two-dimensional light modulation device for modulating the laser light emitted from the laser light source;
a display surface for displaying the modulated light;
an optical pixel aperture enlarging member for distributing the luminance of the laser light while introducing the laser light to apertures of pixels of the two-dimensional light modulation device; and
a display pixel aperture enlarging portion for optically enlarging the modulated light by the apertures of the pixels of the two-dimensional light modulation device corresponding to pixels of an image to be displayed on the display surface,
wherein the luminance of a partial area of each pixel of the image displayed on the display surface is controlled to be below the threefold of an average value of the luminance in the area of the entire pixel by the optical pixel aperture enlarging member and the display pixel aperture enlarging portion.

2. An image display apparatus according to claim 1, wherein:
the optical pixel aperture enlarging member is a microlens array, in which a plurality of microlenses arranged in a one-to-one correspondence with the respective pixels of the two-dimensional light modulation device for introducing the laser light toward the apertures of the corresponding pixels are arrayed;
each microlens has a plurality of focal points; and
a plurality of focal points of the laser light focused by each microlens are discretely or continuously located.

3. An image display apparatus according to claim 2, wherein a distance between the most spaced apart ones of the plurality of focal points is longer than a distance between adjacent pixels of the two-dimensional light modulation device.

4. An image display apparatus according to claim 2, wherein the plurality of focal points are more distant from an incident surface of each microlens as an incident position of the laser light on the incident surface is located more toward an outer circumferential portion from a central part of the incident surface.

5. An image display apparatus according to claim 2, wherein:
the laser light emitted from the laser light source includes blue laser light, green laser light and red laser light;
the distance between the most spaced apart ones of the plurality of focal points differs among the blue laser light, the green laser light and the red laser light; and
a distance Db between the focal points of the blue laser light, a distance Dg between the focal points of the green laser light and a distance Dr between the focal points of the red laser light satisfy the following relationship:

Db>Dg and Db>Dr.

6. An image display apparatus according to claim 1, wherein an aperture ratio of each pixel of the two-dimensional light modulation device is below 80%.

7. An image display apparatus according to claim 1, wherein the display pixel aperture enlarging portion converts the modulated light into circularly polarized light.

8. An image display apparatus according to claim 7, wherein the display pixel aperture enlarging portion includes at least one birefringent plate having a wedge angle and enlarges the modulated light by causing the modulated light to be incident on the birefringent plate to separate it into two lights having different emergence angles.

9. An image display apparatus according to claim 8, wherein the display pixel aperture enlarging portion includes two birefringent plates having wedge angles orthogonal to each other.

10. An image display apparatus according to claim 1, wherein the display pixel aperture enlarging portion converts the modulated light into randomly polarized light.

11. An image display apparatus according to claim 1, further comprising a deflection direction changer arranged between the laser light source and the two-dimensional light modulation device for changing a beam deflection direction of the laser light emitted from the laser light source with time.

* * * * *